United States Patent
McEvoy et al.

(10) Patent No.: US 11,435,005 B2
(45) Date of Patent: Sep. 6, 2022

(54) ACTUATOR WITH SPRING COMPRESSION AND DECOUPLING

(71) Applicant: Vault Pressure Control LLC, Houston, TX (US)

(72) Inventors: Travis McEvoy, Houston, TX (US); Keith Adams, Katy, TX (US); Jeremy Choate, Houston, TX (US)

(73) Assignee: Vault Pressure Control LLC, Houston, TX (US)

( * ) Notice: Subject to any disclaimer, the term of this patent is extended or adjusted under 35 U.S.C. 154(b) by 0 days.

(21) Appl. No.: 16/844,626

(22) Filed: Apr. 9, 2020

(65) Prior Publication Data

US 2020/0340595 A1 Oct. 29, 2020

Related U.S. Application Data

(60) Provisional application No. 62/968,689, filed on Jan. 31, 2020, provisional application No. 62/838,710, filed on Apr. 25, 2019.

(51) Int. Cl.
| | |
|---|---|
| *F16K 31/04* | (2006.01) |
| *F16K 31/56* | (2006.01) |
| *F16H 25/20* | (2006.01) |
| *F16K 3/02* | (2006.01) |

(52) U.S. Cl.
CPC .......... *F16K 31/047* (2013.01); *F16K 31/566* (2013.01); *F16H 2025/2068* (2013.01); *F16K 3/0254* (2013.01)

(58) Field of Classification Search
CPC ........... F16K 31/047; F16H 2025/2068; F16H 25/2454
See application file for complete search history.

(56) References Cited

U.S. PATENT DOCUMENTS

| | | | | |
|---|---|---|---|---|
| 2,014,314 A | * | 9/1935 | Defenbaugh | F16K 1/38 251/122 |
| 2,061,852 A | * | 11/1936 | Schweitzer | F16K 1/54 251/122 |
| 2,930,571 A | * | 3/1960 | Vogl | F16K 31/047 251/69 |
| 3,640,140 A | * | 2/1972 | Gulick | F16H 25/2204 74/89.38 |

(Continued)

FOREIGN PATENT DOCUMENTS

WO    2019/002906    1/2019

*Primary Examiner* — David Colon-Morales
(74) *Attorney, Agent, or Firm* — Morgan, Lewis & Bockius LLP (57) ABSTRACT

An apparatus for actuating an end-member is disclosed. The apparatus includes a housing, a spring within the housing, and a spring plate forming a restriction for the spring within the housing. A brake member is associated with the spring plate for retaining the spring plate in one or more positions. A drive rod is associated with a motor to enable a first movement of the drive rod and to enable a second movement of spring plate. The first movement or the second movement enables the actuating of the end-member in one or more different positions for the end-member. The brake member may be engaged or disengaged to control or decouple spring compression forces in the actuator when the spring is compressed.

17 Claims, 6 Drawing Sheets

(56) References Cited

U.S. PATENT DOCUMENTS

| | | | | |
|---|---|---|---|---|
| 3,989,223 A * | 11/1976 | Burkhardt | F16K 31/163 | 251/58 |
| 4,463,291 A * | 7/1984 | Usry | G05D 3/18 | 310/83 |
| 4,997,162 A * | 3/1991 | Baker | F16K 31/1221 | 251/327 |
| 5,182,498 A * | 1/1993 | Stuhr | F16H 33/00 | 318/15 |
| 5,195,721 A * | 3/1993 | Akkerman | F16D 27/105 | 192/56.1 |
| 5,295,907 A * | 3/1994 | Akkerman | F16D 27/105 | 192/56.33 |
| 5,501,424 A * | 3/1996 | Williams | F16K 3/0227 | 251/1.3 |
| 5,518,462 A * | 5/1996 | Yach | F16H 37/041 | 251/129.11 |
| 5,544,855 A * | 8/1996 | Henken | F16K 1/54 | 251/121 |
| 5,685,492 A * | 11/1997 | Davis | F02M 61/08 | 239/533.12 |
| 5,832,779 A * | 11/1998 | Madrid | F16H 25/20 | 74/89.39 |
| 5,916,325 A * | 6/1999 | Madrid | F16H 25/2021 | 74/89.38 |
| 5,983,743 A * | 11/1999 | McGregor | F16D 27/105 | 251/129.13 |
| 5,984,260 A * | 11/1999 | Rawson | F16K 31/047 | 251/71 |
| 6,082,405 A * | 7/2000 | Qvarfordh | F16K 47/04 | 137/625.37 |
| 6,488,260 B1 * | 12/2002 | Dietz | F16K 31/047 | 251/129.13 |
| 6,769,666 B2 * | 8/2004 | Hall | F16K 1/54 | 251/121 |
| 6,981,428 B2 * | 1/2006 | Donald | F16K 31/047 | 74/89.26 |
| 7,201,188 B2 * | 4/2007 | Baumann | F16K 1/54 | 137/625.33 |
| 8,864,103 B2 * | 10/2014 | Lovgren | H02K 7/06 | 251/71 |
| 8,910,650 B2 * | 12/2014 | Andersen | F16K 1/54 | 137/15.06 |
| 10,208,711 B2 * | 2/2019 | Moser | F16K 31/0655 | |
| 10,480,456 B2 * | 11/2019 | Moser | F02M 21/0257 | |
| 10,533,667 B2 * | 1/2020 | Hoang | F16K 3/30 | |
| 10,851,905 B2 * | 12/2020 | McEvoy | F16K 3/32 | |
| 2001/0025892 A1 * | 10/2001 | McCoy | F02M 21/0269 | 239/589 |
| 2005/0082393 A1 * | 4/2005 | Borissov | F02M 21/0269 | 239/533.2 |
| 2015/0060715 A1 * | 3/2015 | Hoang | F16K 3/0263 | 251/328 |
| 2017/0138154 A1 * | 5/2017 | Burdick | F16K 31/047 | |

* cited by examiner

ACTUATOR WITH SPRING COMPRESSION AND DECOUPLING

CROSS-REFERENCE TO RELATED APPLICATIONS

This non-provisional application is related to and claims the benefit of priority from U.S. Provisional Application No. 62/838,710, filed Apr. 25, 2019, entitled "ACTUATOR WITH SPRING COMPRESSION AND DECOUPLING," and from U.S. Provisional Application No. 62/968,689, filed Jan. 31, 2020, also entitled "ACTUATOR WITH SPRING COMPRESSION AND DECOUPLING," the full disclosures of which are incorporated herein by reference for all intents and purposes.

BACKGROUND

The present disclosure is generally related to actuator assemblies, and in particular, to actuators for actuating an end-member having valves or shearing components used in wellheads and on related tree assemblies.

Actuators may be used in wellhead and related assemblies to control end-members, such as a valve end-member or a shearing end-member. The actuator controls opening and closing of valves or shearing of wirelines, among other operations. A determined amount of force may be required to enable effective actuation depending on the application. Moreover, the actuators may be required to keep their state or position while controlling an associated end-member, whether the valve or a shearing component. In addition, the actuators may be associated with safety standard requirements for instantaneous actuation in either closing or opening configurations. A return spring may be used in the actuators to provide such a safety feature. The use of the return spring introduces spring compression forces against components in a housing holding the spring. The spring compression forces may be damaging to the components and need to be addressed when the actuator is stroked.

SUMMARY

An apparatus for actuating an end-member is disclosed. The apparatus includes a housing, a spring within the housing, and a spring plate forming a restriction for the spring within the housing. A brake member is associated with the spring plate for retaining the spring plate in one or more positions. A drive rod is associated with a motor to enable a first movement of the drive rod and to enable a second movement of spring plate. At least one of the first movement or the second movement enables the actuating of the end-member in one or more different positions for the end-member. The brake member may be engaged or disengaged to control or decouple spring compression forces in the actuator when the spring is compressed.

A method for actuating an end-member is also disclosed. The method includes providing a housing having a spring and a spring plate so that the spring plate forms a restriction for the spring within the housing. A retaining step of the method uses a brake member to retain the spring plate in one or more positions. Further, the method includes enabling, using a drive rod associated with a motor, a first movement of the drive rod and a second movement of spring plate. At least one of the first movement or the second movement causes the actuating of the end-member in one or more different positions for the end-member. The method can include engaging or disengaging the brake member to control or decouple spring compression forces in the actuator when the spring is compressed.

BRIEF DESCRIPTION OF THE DRAWINGS

Some of the features and benefits of the present invention having been stated, others will become apparent as the description proceeds when taken in conjunction with the accompanying drawings.

While the invention will be described in connection with the preferred embodiments, it will be understood that it is not intended to limit the invention to that embodiment. Instead, the preferred embodiments are intended to cover all alternatives, modifications, and equivalents, as may be included within the spirit and scope of the invention as defined by the appended claims.

DETAILED DESCRIPTION

So that the manner in which the features and advantages of the embodiments of actuators with spring compression and decoupling, as well as methods to manufacture, operate, and others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments of the disclosure and are therefore not to be considered limiting of the present disclosure's scope, as it may include other effective embodiments as well.

The actuator of the present disclosure includes a spring to provide spring compression associated with a spring plate, a drive rod and a stem, and includes a brake system for decoupling spring compression forces of the spring when the spring is compressed. This, as well as methods to operate such an actuator of the present disclosure, will now be described more fully hereinafter with reference to the accompanying drawings in which embodiments are shown. The actuator of the present disclosure; the spring, the spring plate, and drive rod providing spring compression; and the brake system providing decoupling of spring compression forces of the spring, as well as associated operations of the present disclosure may be in many different forms and should not be construed as limited to the illustrated embodiments set forth herein; rather, these embodiments are provided so that this disclosure will be thorough and complete, and will fully convey its scope to those skilled in the art.

Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

As in the above description, the present disclosure resolves the above-stated concerns, in actuator assemblies, using a brake or related system that decouples spring compression forces from an actuator stroke provided by a spring, a spring plate, a drive rod, and a stem assembly. The actuator may control a valve or a shearing mechanism associated with the actuator via an end-member. Therefore, the present disclosure also addresses shearing requirements of different diameters of wireline (also referred to herein as a wireline rope) that are associated with different spring compression forces required for shearing the wireline. The actuator of the present disclosure allows custom control of the spring compression and allows the actuator to function independent of the spring compression force by the brake system, for instance. In an example, the actuator includes one or more motorized units, working synchronously, in combination with a brake system having a brake controller and a brake member, to control an amount of the spring compression available in the actuator. In an example, one or more spring plates may be used to compress the spring by the associated one or more motorized units and the drive rod.

The motor enables two separate movements or functions. For example, the motor in association with the drive rod causes the spring plate to compress the spring in a first movement, and causes the drive rod itself to move linearly in a second movement. One or more of the first movement and the second movement enables the actuating of an end-member associated with the drive rod through. For example, a stem connected to the drive rod and the end-member transfers the actuation within the actuator to the end-member. Further, the first movement and the second movement may be independent of each other. For instance, the spring plate may be moved with the drive rod in a stationary position and the drive rod may be moved with the spring plate in a stationary position. The spring plate may be held in a stationary position by the brake system, while the drive rod may be prevented from rotation by anti-rotation pins or a nut as in the following non-limiting embodiments. In addition, the spring plate held in the stationary position by the brake system decouples spring compression forces that may otherwise act on the gears, the motor, and threads of the drive rod. Independent of a compression applied to the spring, via the spring plate, for instance, once a brake controller of the brake system has been activated, the spring plate can be held in the stationary position. Accordingly, the present disclosure is to an actuator that addresses the above-stated deficiencies by combining a brake system to control spring compression and to decouple a spring compression force from the motor, the gears, and the drive rod.

In an aspect, the brake controller is adapted to increase or decrease the spring compression needed to shear wirelines. For instance, the brake controller may cause a brake to be applied to a brake member associated with the spring plate. The brake may be sufficient resistance to support controlled shear of a wireline as the movement of the end-member is controlled and deliberate. Separately, or in association with the brake controller, the decoupling offered to the spring plate increases component life as the components at issue, to maintain a position of the spring plate (e.g., the drive rod and the motor), would not be subject to the spring compression forces. Instead, the brake absorbs or holds the spring compression forces. The brake controller also enables the custom control of the spring compression forces required for the spring plate to compress the spring and to enable activation of an end-member, such as to open an associated valve or cause a shear action. The shearing action also relates to an amount of compression forces asserted by the drive rod (and the motor) or by the spring plate (and the motor) to enable the end-member to shear different sizes of wireline components in a wellhead assembly. When the end-member is a valve, the value supported by the present actuator may be a gate valve, a wedge gate valve, a disc valve, a ball valve, or any other sealing member adopted to sit on a seat to control fluid flow through the valve. However, the valve may include other components that are associated with the disc, ball, or other sealing member. The disc or ball valves of the present disclosure may be quarter turn valves, or may be gate or wedge gate valves. When reference is made to a valve fully open, the stem is actuated to a fully lowered position so that the end-member is away from the housing. When reference is made to a valve in fully open position, the stem is actuated to a fully raised position so that the end-member is resting on the backseat of the housing or associated with the housing.

In an aspect, the present disclosure provides an actuator that allows independent settings for a spring, such as a compression spring within the actuator; provides support to a valve that can operate without a spring force component by the drive rod controlling the valve movements, for instance; provides customized compression by the combination of the spring and the drive rod for wireline shear; and provides an actuator that requires a lower torque for actuation without a spring compression force component. Wireline shearing in gate valves using the present actuator and associated valve can support increased spring force without a comparable increase to the spring component (i.e., replicating shearing capability of a larger spring without the need of the larger spring).

Figure 1:
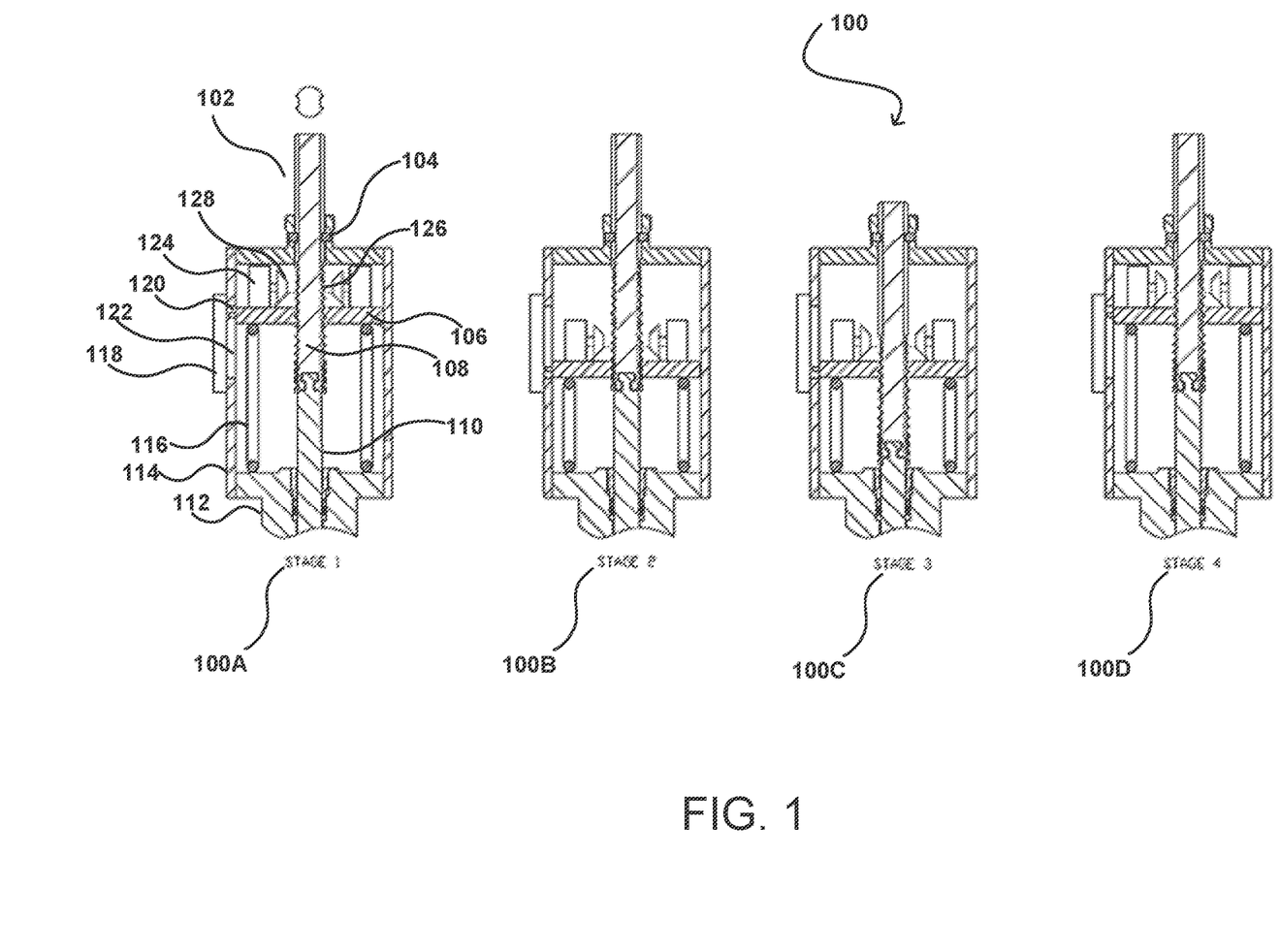
FIG. 1 illustrates cross-sectional views of an example actuator of the present disclosure in different functional positions.

FIG. 1 illustrates cross-sectional views 100 of an example actuator 102 of the present disclosure in different functional positions 100A-D. The example actuator 102 benefits from controlled spring compression and from decoupling of the spring compression forces at least because of an associated brake system, as described throughout this disclosure. The brake system includes a brake controller 118 and a brake member 120. The brake controller 118 can include associated components for transferring the braking force or action on the braking member 120. A person of ordinary skill, upon reading the present disclosure, would recognize that the components transferring the braking force or action on the brake member includes a brake. The brake asserts an electrical, a pneumatic, a friction, a mechanical, or an electromagnetic braking force or action on the brake member 120. In an example, a mechanical brake includes brake shoes or pads forming the brake and an electromagnetic brake includes a liner (or friction disk) and/or an armature forming the brake. The brake shoes or pads, or the liner and/or the armature transfer brake force according to signals or actions asserted from the brake controller 118 to the brake member, such as to hold the brake member 120 in place. The brake member 120, by its association the spring plate 106, then holds the spring plate 106 in place, thereby decoupling spring compression forces acting from the compressed springs 116 backward to the drive rod 108, the gears 128, and the motor 124.

The functional positions 100A-D may also be referred to herein as stages. The actuator 102 includes a stem 110 connected to a drive rod 108 by any appropriate connection—including a nut and bolt, a weld, a clamp, a pin, etc. The drive rod 108 includes threading 126 that is threaded by gears 128 on one or more sides. The spring plate 106 is available in conjunction with one or more springs 116. The one or more springs 116 may be fixed to the spring plate at a first end (or ends) of the one or more springs and may be fixed to an interior portion of housing 114 on a second end (or ends). Alternatively, the one or more springs 116 may be freely positioned within the housing, but may be restrained due to space and structure restrictions of the housing 114. The space and the structure keep the springs 116 in position to perform the functions as described in this and other embodiments of this disclosure. A bonnet 112 houses a bottom portion of the drive stem and connects to housing for a valve body if the application is for a valve. In an alternate or the same example, the bonnet 112 extends to house the bottom portion of the stem or drive stem 110 and the valve body. In an aspect, the stem 110 couples to an end-member and the end-member may be a part of a valve or may be a shearing component.

Brake controller 118 applies an appropriate braking action to a brake member 120 associated with the spring plate 106. The appropriate braking action may be a determined in pounds of force required to close or valve or shear a wireline; and may be calculated based in part on the fluid or wirelines properties to be addressed by the actuator. In an example, the brake controller 118 may include one or more of the above-referenced types of brake, including an electric brake, a pneumatic brake, a hydraulic plunger, a friction brake (e.g., a Murphy brake or a caliper brake), an electromagnetic brake, an electric clamp, a pneumatic clamp, or a hydraulic clamp. The brake system may include a combination of one or more from each of these example brakes. Further, the brake controller 118 is located adjacent to, and optionally, parallel with the springs 116. The brake controller 118 is also located adjacent to the spring plate 106 because this position allows the brake controller to receive and to act on the brake member 120.

In the example actuator 100, anti-rotation members or pins 104 ensure a longitudinal, axial, or straight line (linear) movement of the drive rod 108, while motor 124 is activated to cause gears 128 to thread the threading 126 on the body of the drive rod 108. The anti-rotation pins 104 may be enabled or supported by one or more of: cap screws and a mating slot/channel; milled flats on the drive rod 108 that mate with a corresponding slot in the housing 114; splines on the drive rod 108 that mate with spline channels in the housing 114 (e.g., similar to a Torx® screw head/driver bit); one-way clutches; or a square or hex milled drive rod 108 that mates with a square or hex hole in the housing 114. As in the examples provided, the anti-rotation members may be a combination of one or more components that are not only pins. Further, the anti-rotation members are associated with a portion of the drive rod 108 and limits rotation of the drive rod 108 beyond a determined position for the drive rod relative to the spring plate. The anti-rotation members 104, therefore, prevent the drive rod from exiting too far out of the housing 114 or entering too far into the housing 114. The location of the anti-rotation members ensures the extent of the movement of the drive rod within the housing and so, the anti-rotation members prevent rotation of the drive rod beyond one or more positions determined for the drive rod relative to the spring plate or the housing. This limitation also ensures that sufficient gap remains between the spring plate and a top of the housing to protect the motor and gears.

Motor 124 may be mounted to the spring plate 106 or may be provided in a manner allowing gears 128 coupled to it to cause movement of the spring plate 106. As such, the motor 124 may be mounted external to the housing itself. Gears 128 may be mounted to the spring plate 106 but may be free to cause the gears to spin relative to the threading 126 (see also, FIG. 4), without substantial auxiliary movement that may affect its ability to move the drive rod 108.

A person of ordinary skill would recognize that the components for the functional position 100A of example actuator 102 is the same across functional positions 100B-D, but that the functional positions 100B-D illustrate different positions for the components as a result of activation or deactivation of the actuator 100. For example, in at least functional positions 100B, C, the drive rod 108, the stem 110, the brake member 120, the spring plate 106, the gears 128, and the springs 116 are in different positions as these functional positions 100B, C illustrate different stages of function or operation of the actuator 100. As such, the components for functional positions 100B-D, while not marked as in example 102, are understood to a person of ordinary skill as being the same as in example 102, but in different positions because of the operation of the actuator 100.

Figure 4:
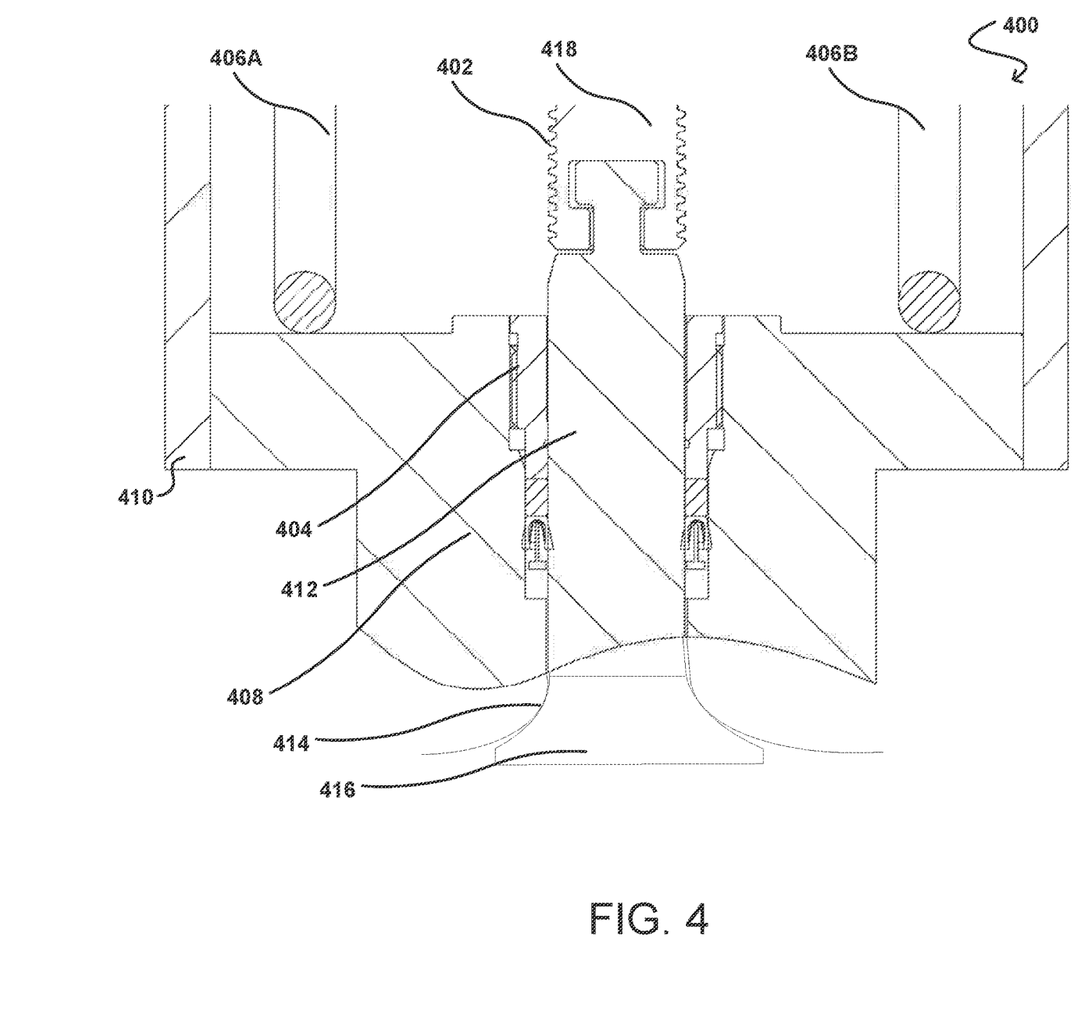
FIG. 4 illustrates example aspects of a valve bonnet backseat that may be associated with an actuator, such as the example actuators described in FIGS. 1-3.

In operation, at a first stage or functional position 100A, actuator 102 is illustrated with stem 110 in a default, rest, or closed position, where a bottom portion or end-member of the stem 110 is resting on a bonnet backseat associated with bonnet (see FIG. 4, for instance). In an example, the end-member or bottom portion is contiguous with the stem 110 or may be a separate attachment to stem 110. When the end-member of the stem 110 is a valve that is resting on the bonnet backseat, then the valve may be considered shut. The shutting or opening of the valve is not illustrated with respect to a seat that prevents fluid flow, but with respect to its position against a backseat of the actuator. A person of ordinary skill would understand upon reading the present disclosure that when the valve is open with respect to the actuator, it is extended from the backseat of the actuator to a seat across a pipe for instance, and can block flow within the pipe and through the valve, as a result. The valve is closed with respect to the pipe and is open with respect to the actuator. When the end-member of the stem 110 is a shearing component that is resting on the bonnet backseat, then no shearing may occur. No spring compression or the least amount of spring compression is asserted on springs 116 in such a position. The motors 124 are also at idle or switched off, the gears 128 are at rest, and the spring plate 106 and its associated brake member 120 are at the top most position within housing 114. In functional position or first stage 100A, the motor 124 and the brake controller 120 may be in off-position so that the springs 116 are fully extended and the drive rod 108 is mostly outside the housing 114. In the first stage, the brake member 120 is at a first maximum allowable position in groove, guide, or member area 122. The valve is closed in this position.

To arrive at the second stage or function position 100B, example actuator 102 that was previously in idle or deactivated functional position 100A, as illustrated in example 102, is activated. In the process of activating the actuator 100, the motor 124 is first turned on and the gears 128 are caused to rotate against threading 126. With the drive rod 108 providing sufficient resistance or requiring a higher force to be moved than the compression required by the springs 116, the gears 128 are able to drive against the drive rod 108 and are able to cause the spring plate 106 and associated brake member 120 to move relative to the drive rod 108. The movement of the spring plate could also be because of a restriction by the anti-rotation pins 104 to the drive rod 108. The drive rod 108 remains in position while the spring plate 106 moves so as to compresses springs 116. The gears 128 climb down the drive rod 108 till the brake member 120 reaches a second maximum allowable position in groove, guide, or member area 122. Pertinently, in the second stage and during the activation of the actuator 102 to reach the second stage 100B, because the gears 128 and motor 124 are associated with the spring plate 106, the spring plate 106 moves down as well. The springs 116 are under compression with spring compression forces acting out from the direction of the compression. In this stage, as the stem 110 and the drive rod 108 remain in position, the valve remains closed or the shearing component does not perform a shearing action.

Subsequently, once the second stage 100B is reached, the brake controller 118 may apply a braking force to the brake member 128 to stop the movement of the associated spring plate 106. Additionally, the brake controller 118 may be activated at any point during the brake member 120 travelling from the first maximum allowable position to the second maximum allowable position of the guide 122. This midway activation enables control so that motor or the gears are not stressed by the spring compression force as the spring compresses. In the second stage 100B, the brake member 120 is illustrated at the lower end and the brake controller 118 may be activated to hold the brake member 120 in this position with the motor 124 being shutoff or being reverted to an idle position. The valve may remain closed or, if the resistance offered by the drive rod 108 is overcome by the gears moving the spring plate, then such movement may cause the stem 110 to move slightly down in the housing and may be sufficient to partly open the valve or partly begin shearing of a wireline.

At the third stage or functional position 100C, with or without activation of the brake controller 118 (or with least activation to limit free movement, but not to limit all movement, of the brake member 120), and with motor 124 continuing to be in activated from the second stage 100B, the stem 110 may be caused to be lowered in a deliberate manner. Pertinently, the gears 128 are rotating but the brake member 120 is limited or unable to move further because it has reached the second maximum allowable position of the guide 122. In such a configuration, the movement of the gears 128 pulls the threads of the drive rod 108 down, which then causes stem 110 to move down and to open the valve or to activate the shearing component. As previously noted, the brake force need not be asserted at this point or may be asserted to reduce the spring compression forces acting on the motor and the gears. Alternatively, the brake force from the brake controller 118 may be fully and continually asserted in this stage and with the gears 128 having climbed down the drive rod 108 to the farthest allowed by the brake member 120 in the guide 122, the stem 110 is caused to fully move down. The valve associated with the stem 110 is fully opened or the shearing action is completed.

At the fourth stage or functional position 100D, an emergency or a full closing of the valve may be signaled to the brake controller 118. As a result, the motor is switched off and the braking force asserted on the brake member 120 is withdrawn or removed. However, the motor may be first reversed to pull the drive rod and stem, before the brake is released to bring the spring plate up. The release of the brake causes the springs 116 to begin to decompress from its compressed position that is illustrated in functional positions 100B, 100C. The decompressing spring applies the spring decompression force on the spring plate 106 and, in the absence of the brake, causes the spring plate 106 to move towards the top of the housing 114, away from the valve bonnet backseat. The decompression, in a first action, causes the spring plate 106 to move back up, which may, in turn, cause the associated gears 128 to pull the drive rod 108 back up and away from the valve bonnet backseat. As previously noted, the motor may be reversed to assist speedy reversal of the gears and removal of the stem back into the housing and away from the bonnet. Simultaneously or in a second action, the spring plate 106 and the associated brake member 120 begin to move from the second maximum allowable position to the first maximum allowable position in the groove 122. The stem 110 follows the drive rod 108 back into the housing. This causes the bottom portion of the stem 110 to sit back on the valve bonnet backseat and causes the valve to close (see e.g., FIG. 4 and associated discussion). The fourth stage 100D illustrates an emergency relief procedure to close the valve or to stop shearing.

Figure 2:
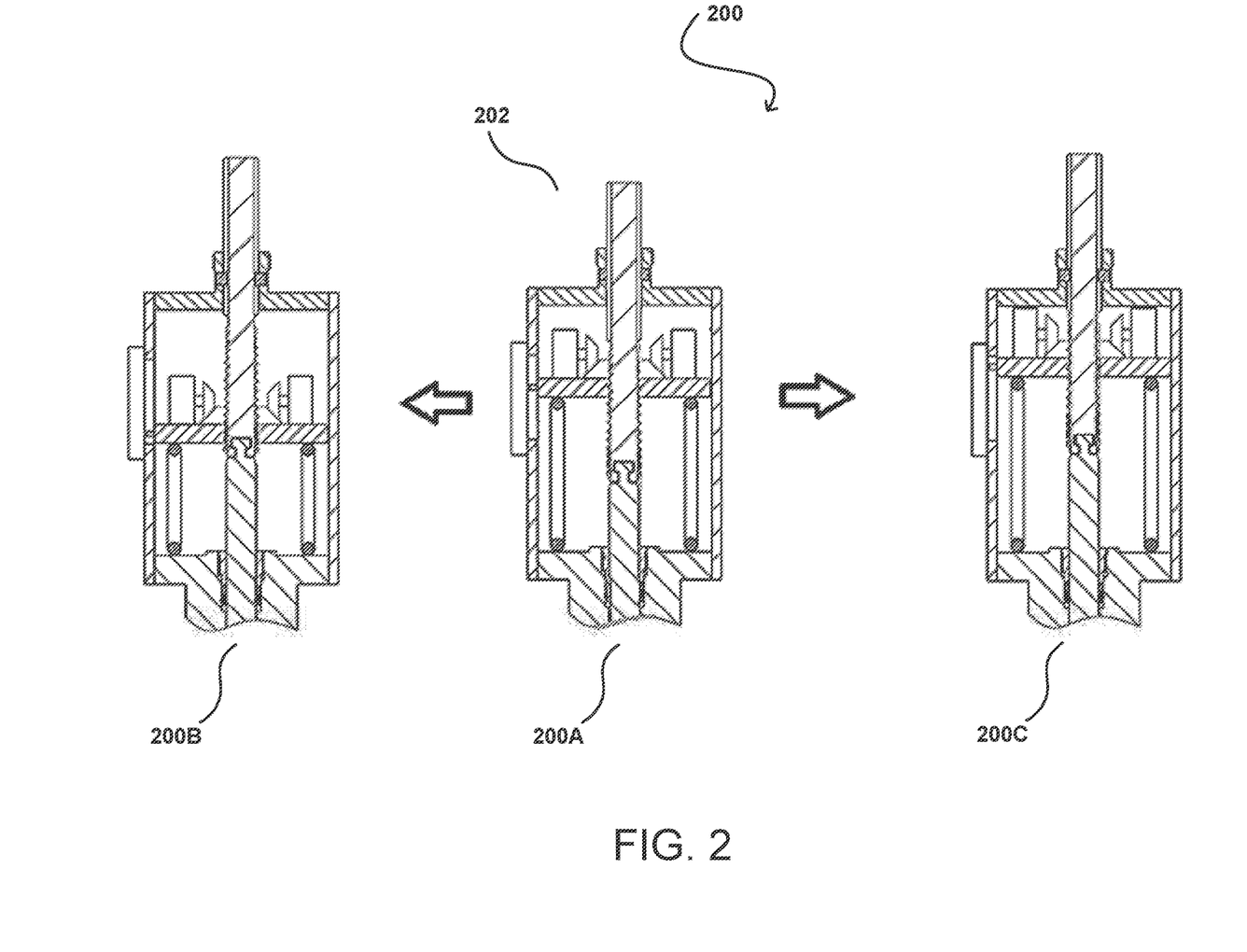
FIG. 2 illustrates further cross-sectional views of an example actuator of the present disclosure in different functional positions.

FIG. 2 provides additional cross-sectional views 200 of an actuator 202 to illustrate intermediate functional positions or stages 200A, 200B for the actuator of FIG. 1. Functional position or stage 200C may be similar to stage 1 or stage 4 functional positions 100A, D. Further, a person of ordinary skill would recognize from the present disclosure that, as the views 200 are of different functional positions of an actuator 202 that is similar to actuator 102 in FIG. 1, components referenced in functional position 100A apply to actuator 202. FIG. 2 illustrates that the example actuator 202 is adapted for fine control of the valve open and close positions (or shearing positions). For example, from a fully open valve position (e.g., functional position 100C), it is possible to effect a change to the drive rod and the stem to bring the drive rod and stem back up to close the valve or stop the shear, as illustrated in functional position 200B. In functional position 200B, the brake member 120 remains in the second maximum allowable position in the groove, guide, or member area 122, but with the drive rod 108 is fully raised and the valve being fully closed. The example actuator 202 is also able to go from the open valve position of functional position 100C to a partly open or partly closed position as in functional position 200A, where the brake member 120 is retained or held in a partial position—anywhere—between the first and the second maximum allowable positions in the groove, guide, or member area 122. As a result, the spring plate 106 is also retained or held in the partial position.

The present actuator 202 is also able to go from the open valve position as in functional position 100C or any of the other positions in the functional positions 200A, 200B of FIG. 2 to a fully closed position, as in functional position 200C (or functional positions 100A, 100D), where the brake member 120 is released to the first maximum allowable position in the groove, guide, or member area 122, and where the stem 110 is fully raised. This may be a result of an emergency instruction or shutoff instruction to the actuator or the valve via brake controller 118. As a result, the valve positioning, as in the functional position 100D, is replicated, where the springs 116 decompress and the spring plate 106 rises fully after the drive rod 108 is fully raised to shut the valve or stop shearing.

In each of the positions of functional positions 100B, 100C, 200A, and 200B, the motor is asserted to the extent that a desired position of the spring plate 106 is reached or a predetermined or desired compression or deflection of associated springs 116 is reached. When the desired position, compression, or deflection is reached for the brake member 120 (and, in turn, for the associated spring plate 106), then the brake controller 118 asserts braking force to hold the brake member 120 (and the spring plate 106) in position. Thereafter, the motor may be switched off to decouple the spring compression forces that would act on the threads, the gears, and the motor from the actuator stroke. As a result, wear on the motor and related components is reduced. Power consumption is also reduced as the motor may be switched off and the brake requires relatively lesser power than the motor to maintain the spring plate 106 in the desired position or the springs in the desired compression. Further, if the actuator is used in an embodiment for shearing wirelines, the brake controller is configured to increase or decrease the spring compression needed to shear wirelines. Separately, or in association with the control offered by the brake controller, the decoupling of the spring compression forces by the brake increases component life as the components at issue would not be subject to the above-referenced wear caused by the spring compression forces.

Figure 3:
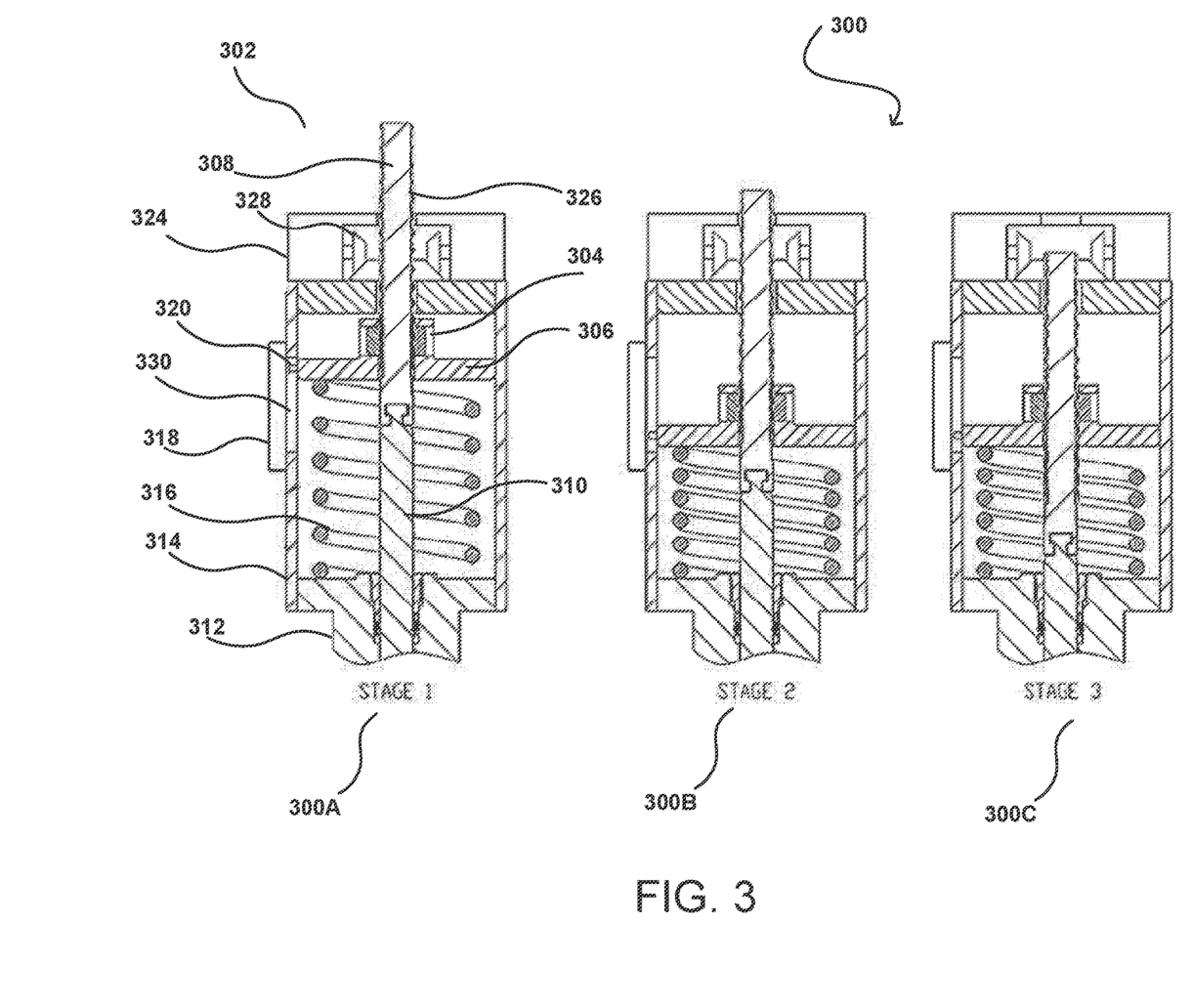
FIG. 3 illustrates cross-sectional views of a different example actuator of the present disclosure in different functional positions.

FIG. 3 provides cross-sectional views 300 of another example actuator 302 in different functional positions 300A-300C, in accordance with an aspect of the present disclosure. Actuator 302 includes a single spring 316. In addition, the motor 324 is mounted external to the housing 314. The gears 328 may be part of the motor or associated with the motor and also located external to the housing 314. Further, a nut 304 is used in the place of anti-rotation pins 104. Nut 304 performs a similar anti-rotation function as anti-rotation pins 104. Still further, as in the case of actuator 102, actuator 302 includes a stem 310 connected to a drive rod 308 by any appropriate connective process—including bolts, welds, clamps, pins, etc. The drive rod 308 includes threading 326 that is threaded by gears 328 on one or more sides of the threads 326. In an aspect, the threads 326 may be self-locking threads.

A spring plate 306 is available in conjunction with spring 316. Spring 316 is fixed to the spring plate 306 on a first end and is fixed to an interior portion of housing 314 on a second end. A bonnet 312 houses a bottom portion or end-member of the stem 310 and connects to the housing 314 for a valve body if the end-member includes a valve. The end-member may include a shearing component, in an aspect. In an alternate or the same example, the bonnet 312 extends to house the bottom portion of the stem 310 and to house the valve body. Brake controller 318 is provided to apply appropriate braking action to a brake member 320 associated with the spring plate 306.

FIG. 3 illustrates an embodiment where movement of the drive rod 308 occurs first. This may be by activating the brake controller 318 to hold the brake member 320 in position; and activating the motor 324 to drive the drive rod 308 down. Alternatively, the nut 304 allows movement of the drive rod 308 till a gap in the threads 326 is reached and the nut is engaged with the drive rod 308 to restrict the drive rod 308 from advancing any further. When the drive rod 308 cannot advance any further, the gears 328 can continue to thread the drive rod 308 forcing both, the nut 304 and the spring plate 306 down, and causing the spring 316 to compress. The first movement of the drive rod 308 may cause the end-member to be actuated. The second movement of the spring plate 306, one the nut 304 is engaged, supports further actuating of the end-member if actuated during the first moment. Relative to the embodiment of FIG. 1, where the first movement is illustrated as the movement of the spring plate, the embodiment of FIG. 3 supports a first movement that is the movement of the drive rod 308. Alternatively, both components (e.g., the spring plate and the drive rod) may be moving together with either the spring plate or the drive rod moving relatively faster or slower than the other component. In either case, when a brake is applied to the brake member 320, then the spring plate is held and only the drive rod is enabled to move. However, when the nut is engaged (or the anti-rotation pin in FIG. 1), then the drive rod is held and may not rotate further. The application of the brake or its release is useful in emergency situations to quickly close or open the valve, or to quickly limit or cause the shearing action.

In function, at a first stage or functional position 300A, a stem 310 of the actuator 302 is positioned in a default, rest, or closed position, where a bottom portion or end-member of the stem 110 is resting on a bonnet backseat associated with bonnet (see FIG. 4, for instance). For example, the stem 310 may be positioned on the valve bonnet backseat when the valve is in closed position with a bottom portion of the stem sitting on the valve bonnet backseat; and the stem 310 may be positioned off the valve bonnet backseat when the valve is opened because the bottom portion of the stem is off the valve bonnet backseat. This is further illustrated in FIG. 4, for instance. In functional position 300A, the motor 324 and the brake controller 320 may be in off or idle condition so that the spring 316 is fully extended (or has least spring compression forces) and the drive rod 308 is mostly outside the housing 314 opposite the bonnet. In the first stage or functional position 300A, the brake member 320 is at a first maximum allowable position in groove, guide, or member area 322. The valve is fully closed in this position.

At the first stage 300A or during movement from the first stage 300A to the second stage or functional position 300B, the stem 310 of the actuator 302 is caused to be moved into the housing 314 (toward the bonnet 312) so that its associated end-member is moved away from the valve bonnet backseat or is moved to cause shearing of a wireline to occur. For example, at or during movement in the actuator 302 to functional position 300B, the motor 324 is turned on and the gears 328 rotate against threading 326. This causes the drive rod 308 to move down, and concurrently or with some delay, the spring plate 306 is also caused to move down. The associated brake member 320 moves with the spring plate 306, relative to the drive rod 308. The spring plate 306 causes compression in spring 316. Once the brake member 320 approaches or reaches the second maximum allowable position in the groove, guide, or member area 322, the drive rod 308 may be independently advanced while the spring plate 306 is held stationary. Alternatively, the brake controller 318 may be activated to apply a braking force to the brake member 328 at any time during its movement to stop or restrict the movement of the associated spring plate 306. The drive rod 308 may be driven independent of the spring plate 306. However, once the brake member 320 is at the second maximum allowable position in the groove 322, then activation of the brake eases the spring compression forces acting on the threads 326, the gears 328, or the motor 324. In the second stage 300B, the valve may remain closed or may be partly open as the stem has moved, but is not fully expressed downwards.

At the third stage or functional position 300C, the brake member 320 is positioned at the second maximum allowable position in the groove 322 and the spring plate 306 does not move further. The brake controller 318 is asserting the braking force continually in this stage unless the valve is required to be closed or shearing is completed. Further, the motor 324 will cause the gears 328 to continue to thread the drive rod 308 to move it down to the farthest point allowed. The stem is fully expressed so the valve is fully open or shearing is fully performed. This positioning of the spring plate 306 relative to the groove, guide, or member area 322 results in the threading action of the gears 328 acting on the drive rod 308 to move the drive rod 308 independent of the spring plate 306 towards the valve bonnet backseat. As the drive rod 308 extends further from the start of the third stage 300C till it is complete, the stem keeps opening the valve or keeps causing the shearing action till the valve is fully opened or shearing is completed.

A fourth stage may follow in an emergency instruction manner for the brake controller 318. In this stage, the intent is to close (e.g., fully or partly) the valve as a result of an emergency. This may be as illustrated and discussed with respect to functional position 100D. In the aspect of FIG. 3, the motor may be switched off and the braking force that was asserted on the brake member 320 may be withdrawn or removed. However, before the braking force is withdrawn or removed, the motor may be applied to first pull the drive rod 308 away from the valve bonnet backseat causing the end-member or bottom portion of the stem to sit on the valve bonnet backseat and closing the valve. When applied for shearing purposes, the shearing action is stopped when the steam is retracted into the housing. Spring decompression may additionally cause the gears 328 to pull the drive rod 308 back to the position illustrated in the first stage 300A. Pertinently, the spring 316 decompresses from its compressed position illustrated in functional position 300B to the relaxed (or least compressed position) illustrated in functional position 300A. The decompressing spring applies a decompression force on the spring plate 306 to push it towards the top of the housing 314 and away from the valve bonnet backseat.

As previously noted, the motor may, in a first action, cause the gears 328 to pull the drive rod 308 from the lowest position away from the valve bonnet backseat. The stem 310 then follows the drive rod 308, which causes the valve to close or a shearing action to cease. The decompression force of the spring may then act on the spring plate 306, either concurrently or subsequently (e.g., after the drive rod 308 is pulled from the valve open position as in functional position 300C) to bring the spring plate 306 back to a position that is illustrated in the first stage 300A. The decompression may represent a part of second action as the gears 328 thread the drive rod 308 up, through the housing 314 and in a direction opposite to the bonnet 312. The spring plate 306 rises, along with the brake member 320, which has no braking force as the brake controller 318 has withdrawn the braking force. The spring plate 306 rises till the brake member 320 reaches the first maximum allowable position in the groove, guide, or member area 322. The valve is fully closed in this position, which is similar to the position in functional positions 300A.

From the above example, the motor may be switched off when the brake is applied to the brake member in each of the examples actuators 102, 202, 302. The brake decouples the spring compression forces from an actuator stroke because the stroking components, including the drive rod, the gears, and the motor are not required to maintain the spring plate in position. In addition, braking support during movement enables controlled movement of the spring plate and the drive rod so that the brake system bears some of the spring compression forces when the actuator is activated and when the end-member is fully or partly engaged (e.g., valve is fully or partly opened, or the shearing component is shearing a wireline). As a result, wear on the motor and related components is reduced. Further, when the actuator is used in an embodiment for shearing wirelines, the brake controller is configured to increase or decrease the spring compression needed to shear wirelines. This may be by additional friction caused in the brake to prevent sudden or quick changes in movement that may load the components. Separately, or in association with the brake controller, the decoupling increases component life as the components at issue would not be subject to the spring forces. Instead, the brake controller allows customized control of the spring compression forces required for the spring to close—thereby controlling the associated valve or shearing component of the end-member.

FIG. 4 details aspects of a valve bonnet backseat 414 that may be associated with the actuators 102; 202, 302 of the present disclosure. In the excerpt 400, the threading or threads 402 is illustrated on the drive rod 418. These threads may be are similar to threads on the drive rods 108; 308 of actuators 102; 302. Springs 406A, 406B are also illustrated, along with valve bonnet backseat 414 that provides a sealing between bonnet 408 and stem 412. A packing 404 provides sealing between the bonnet 408 and stem 412 when a bottom portion or end-member 416 of the stem 412 is off the valve bonnet backseat 414. However, the valve bonnet backseat 414 and the bottom portion or end-member 416 of the stem 412 provide sealing between the bonnet 408 and the stem 412 when the valve is in closed position. Further, the end-member 416 may be a shearing component for shearing wirelines.

Figure 5:
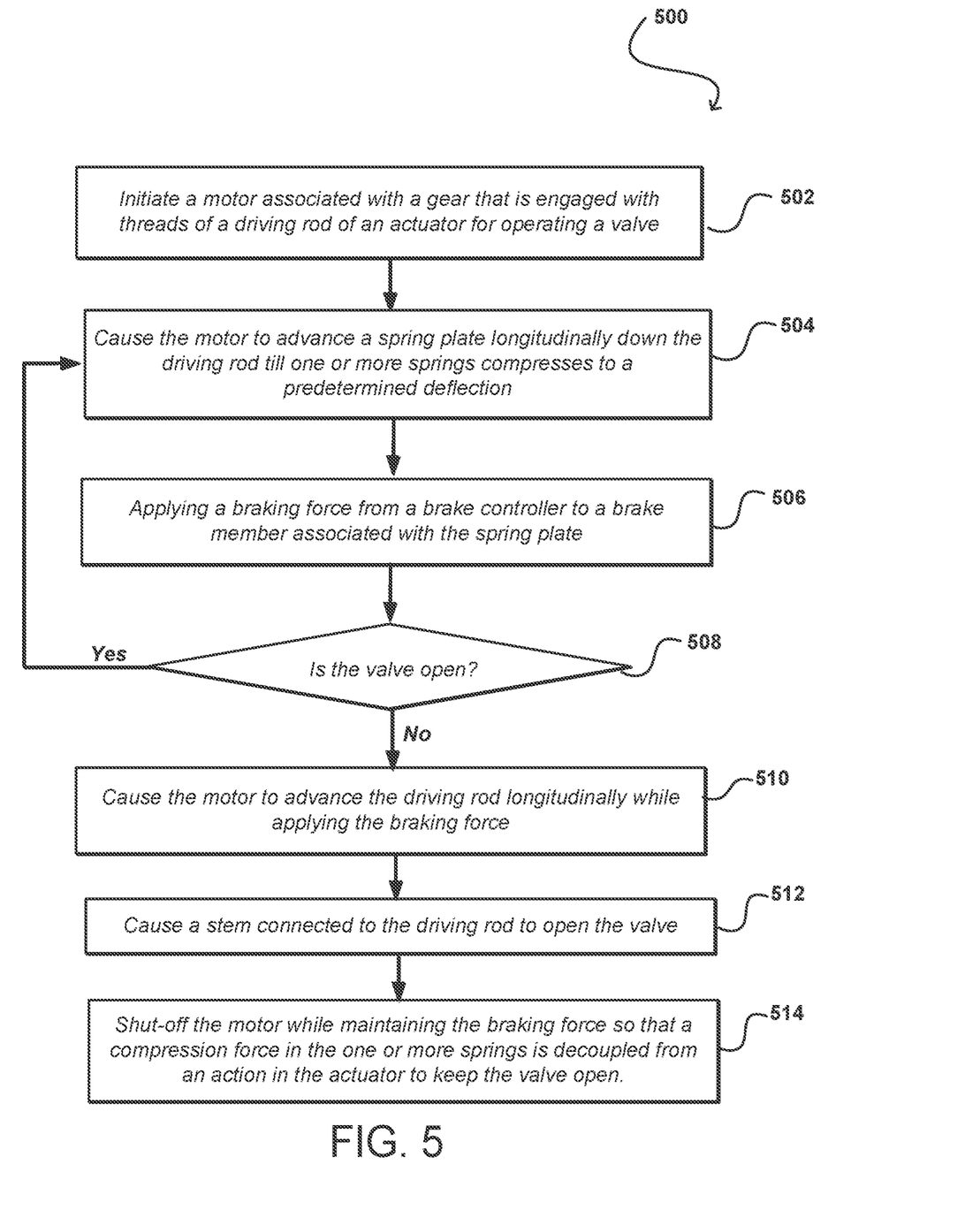
FIG. 5 is a flowchart of example operative actions for controlling actuation using the example actuators of the present disclosure.

FIG. 5 provides a flowchart 500 of operative actions for controlling an example actuator of the present disclosure. Presently, the actuators of the present disclosure achieve a reduction in required opening force for an associated valve. The reduction is enabled by the decoupling of the spring compression forces of the spring during opening of the valve. In addition, the reduction is also as to the overall required opening force for the valve. The reduction achieved may be in the order of between 800 lbs and 4000 lbs for regular small bore valves, and between 8000 lbs and 40,000 lbs for large bore and wireline shearing valves.

In sub-process 502, a motor of the actuator is initiated to control a valve. The actuator is provided with a housing having a spring and a spring plate so that the spring plate forms a restriction for the spring within the housing. The actuator is also associated with gears that are engaged with threads of a drive rod, as illustrated in the example actuators 102; 302 of FIGS. 1 and 3. Sub-process 504 causes the motor and the gears to advance the spring plate longitudinally down the drive rod till one or more springs compress to a predetermined or desired deflection. The gears, therefore, enable a first movement for the spring plate. A retaining step of the method 500 uses a brake member to retain the spring plate in one or more positions. The retaining step may be performed by sub-process 506 that applies a braking force from a brake controller to the brake member associated with the spring plate. As a result, the braking force also applies to the spring plate to retain the spring plate in the one or more positions. Sub-process 508 may be a verification to ascertain if the valve is open or close. This may be by determining a state or position of the drive rod. Sub-process 506 may be repeated till a brake member reaches a maximum allowable position within grooves of a housing of the actuator. Sub-process 510 may be performed if the valve is not opened.

Sub-process 510 causes the motor and the gears to continue to advance the drive rod longitudinally while applying the braking force to the brake member. The gears, via sub-process 510, therefore, enable a second movement for the drive rod. The second movement may occur concurrently with or separately from the first movement. As such, the first movement in sub-process 504 may be different than the second movement in sub-process 510. In addition, when occurring concurrently, there may be a delay between the first movement and the second movement. For instance, the motor causes one or more gears to engage the drive rod using sub-process 504, but may need to overcome a resistance determined by an amount of force required to engage a valve or shear a wirelines as noted above. The drive rod may remain stationary, while the springs may compress with the spring plate moving lower. After sometime, when sufficient force is generated to overcome by the motor and the gear or when the spring plate is held in position, then the second movement occurs to advance the drive rod. This may be when the brake member is at or near the maximum allowable position within grooves of a housing of the actuator. Sub-process 512 causes a stem connected to the drive rod to open the valve or shear the wireline. As such, at least the second movement in sub-process 510 enables the actuating of the end-member in one or more different positions for the end-member. In a further example, depending on where the braking force is asserted for the spring plate, the subsequent second movement of sub-process 510 will not advance the stem further than capable because of the restriction by the anti-rotation pins. Sub-process 514 is a shut-off process for the motor, while maintaining the braking force so that a spring compression force in the one or more springs is decoupled from an action in the actuator to keep the valve open. For instance, the motor, the gears, and the drive rod are not loaded by the spring compression force because the spring plate is held in position by the braking force on the brake member.

Figure 6:
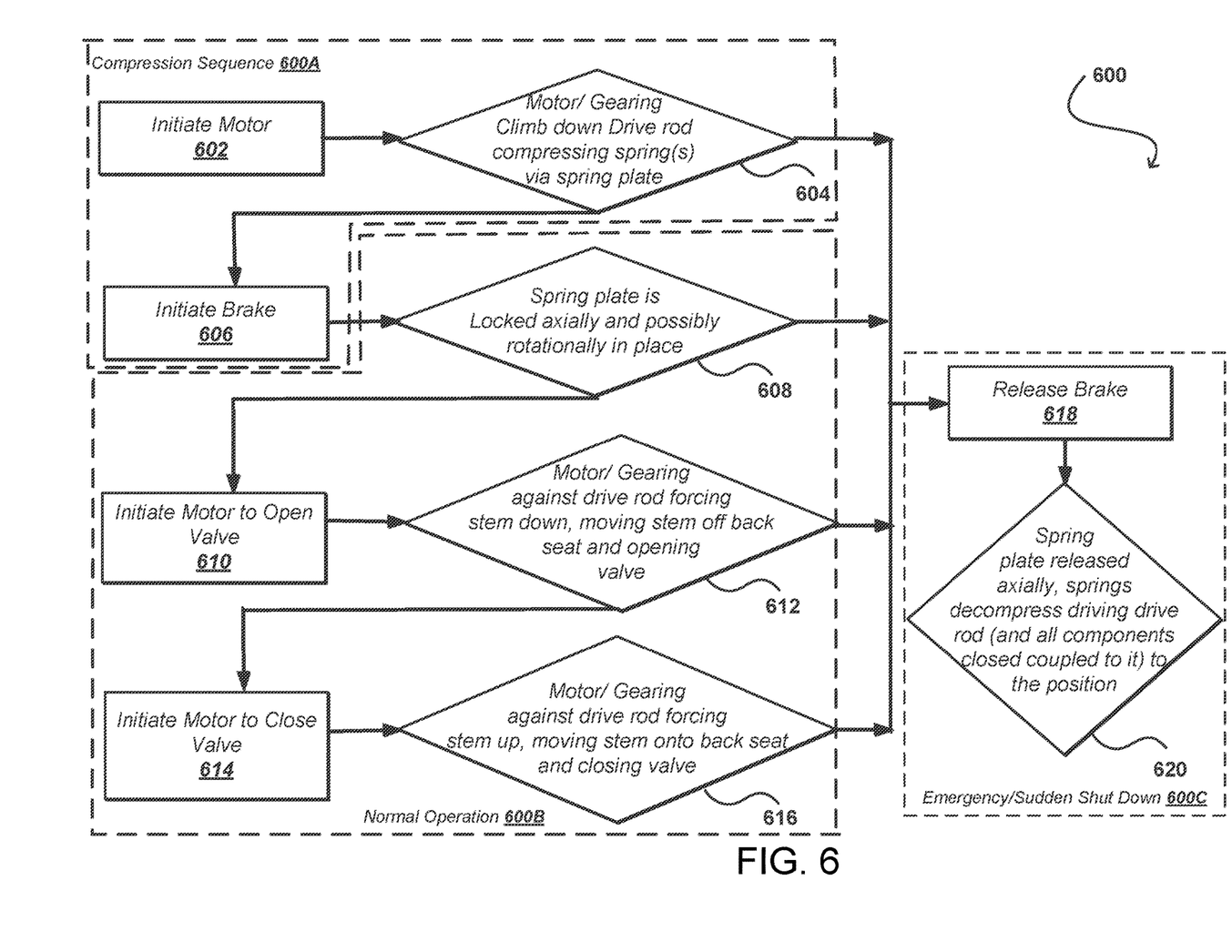
FIG. 6 is another detailed flowchart of example operative actions for controlling actuation using the example actuators of the present disclosure.

FIG. 6 provides a flowchart 600 of further operative actions 600A-C for controlling an example actuator with spring compression and decoupling, in different functional positions, in accordance with an aspect of the present disclosure. In step 602 of grouped steps 600A, the motor is initiated causing the gear to climb down 604 the drive rod with the spring plate compressing the springs. When a desired position for the spring plate (or desired deflection of or load on the springs) has been reached, the brake controller initiates a braking force, at step 606, on the brake member of the spring plate. This is the compression sequence 600A. This is a first movement described in the process 500 of FIG. 5. The spring plate may be locked axially, and possibly, rotationally, in place via step 608 of grouped steps 600B. The motors are initiated again or engaged, via step 610, from a prior disengagement so that the gears act on the threads of the drive rod, but as the brake is initiated, the gear does not climb the drive rod and, instead, forces the drive rod to move towards the valve bonnet backseat of the valve via step 612. This replicates the second movement described in the process 500 of FIG. 5. This causes the stem to follow and a bottom portion of the stem moves off the valve bonnet backseat causing the valve to open. The motors may be initiated via step 614 to cause the valve to close while the brake is still engaged with the brake member, as in step 616. The motors may be initiated in a reverse direction to cause the gears to pull the drive rod out and away from the valve bonnet backseat. The stem follows the drive rod and the bottom portion of the stem sits on the valve bonnet backseat to close the valve. This is the normal operation 600B. From any of steps 604, 608, 612, and 616, an emergency or sudden shutdown 600C may be initiated to cause release of the brake, as in step 618. As a result, the spring plate is released axially, via step 620, and the springs decompress, driving the drive rod (and all components closed coupled to it) to the closed or initial position of the actuator.

A method of the present disclosure may be to manufacturing the present actuator. In a sub-process, the actuator may be provided in a housing having a groove or guide. The groove or guide accepts a brake member which is coupled to a spring plate on one end and which is configured to receive a braking force from a brake controller. The spring plate is configured to compress one or more springs between the spring plate and a lower portion of the housing. One or more motors may be provided with gears coupled to threads of a drive rod. The drive rod is associated with a stem to control a position of a valve. An anti-rotation member is provided to prevent rotational movement to the drive rod beyond one or more positions determined for the drive rod with relation to the spring plate, while supporting longitudinal movement.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. For example, other the recesses can be put into arrangements other than those described, such as all being in a vertical or other arrangement. These and other similar modifications will readily suggest themselves to those skilled in the art, and are intended to be encompassed within the spirit of the present invention disclosed herein and the scope of the appended claims.

The singular forms "a," "an," and "the" include plural referents, unless the context clearly dictates otherwise.

Examples of a brake controller are a programmable logic controller (PLC), which may include computer-readable media and which is enabled for communications achieved for providing valve control as described in the present embodiments. Such a brake controller can include but are not limited to: one or more nonvolatile, hard-coded type media, such as read only memories (ROMs), or erasable, electrically programmable read only memories (EEPROMs); recordable type media, such as flash drives, memory sticks, and other newer types of memories; and transmission type media such as digital and analog communication links. For example, such media can include operating instructions, as well as instructions related to the systems and the method steps described previously and can operate on a computer. Further, the brake controller may be a relay, where if a current is applied to the relay, an associated brake closes to engage a brake member of a spring plate, and if the current is removed, the relay opens causing the brake to release or withdrawn any braking forces acting on the brake member (and consequently on the spring plate. It will be understood by those skilled in the art that such media can be at other locations instead of, or in addition to, the locations described to store computer program products, e.g., including software thereon. It will be understood by those skilled in the art that the various software modules or electronic components described previously can be implemented and maintained by electronic hardware, software, or a combination of the two, and that such embodiment are contemplated by embodiments of the present disclosure.

What is claimed is:

1. An apparatus for actuating an end-member comprising:
a housing;

a spring within the housing;
a spring plate forming a restriction for the spring within the housing;
a brake member associated with the spring plate for retaining the spring plate in one or more positions;
a valve stem comprising the end-member and configured to move independent of the spring plate;
gears associated with a motor to enable a first movement for the spring plate and to enable a second movement for the valve stem, at least one of the first movement or the second movement enabling the actuating of the end-member in one or more different positions for the end-member.

2. The apparatus of claim 1, further comprising:
a drive rod coupled to the valve stem and configured to engage with the gears.

3. The apparatus of claim 1, further comprising
a brake controller controlling the brake member to cause the spring plate to increase, decrease, or retain tension on the spring.

4. The apparatus of claim 1, further comprising:
the motor fixedly mounted on the spring plate; or
the motor fixedly mounted external to the housing.

5. The apparatus of claim 2, further comprising:
at least one anti-rotation member associated with at least a portion of the drive rod preventing rotation of the drive rod beyond one or more determined positions for the drive rod relative to the spring plate.

6. The apparatus of claim 1, further comprising:
a brake controller for controlling the actuating of the end-member by acting on the brake member.

7. The apparatus of claim 6, wherein the brake controller is an electric, pneumatic, hydraulic, friction, or electromagnetic controller.

8. The apparatus of claim 6, further comprising:
a brake associated with the brake controller and the brake member for asserting an electrical, a pneumatic, a friction, a mechanical, or an electromagnetic braking force on the brake member.

9. A method for actuating an end-member comprising:
providing a housing comprising a spring, a valve stem comprising the end-member, and a spring plate, the spring plate forming a restriction for the spring within the housing, wherein the valve stem is capable of independent movement from the spring plate;
retaining, using a brake member, the spring plate in one or more positions; and
enabling, using gears associated with a motor, a first movement for the spring plate and a second movement for the valve stem, at least one of the first movement or the second movement enabling the actuating of the end-member in one or more different positions for the end-member.

10. The method of claim 9, further comprising the step of coupling to the valve stem a drive rod configured to engage with the gears.

11. The method of claim 9, further comprising
controlling the shearing using a brake controller acting on the brake member to cause the spring plate to increase, decrease, or retain tension on the spring.

12. The method of claim 9, wherein the first movement is independent of the second movement.

13. The method of claim 9, further comprising:
fixedly mounting the motor on the spring plate; or
fixedly mounting the motor external to the housing.

14. The method of claim 10, further comprising:
preventing rotation of the drive rod using at least one anti-rotation member associated with at least a portion of the drive rod so that the drive rod is prevented from rotation beyond one or more determined positions for the drive rod relative to the spring plate.

15. The method of claim 9, further comprising:
controlling, using a brake controller, the actuating of the end-member in a fully closed end-member position, a fully open end-member position, and a partially-open end-member position.

16. The method of claim 15, wherein the brake controller is an electric, pneumatic, hydraulic, friction, or electromagnetic controller.

17. The method of claim 15, further comprising:
asserting, using a brake associated with the brake controller and the brake member, an electrical, a pneumatic, a friction, a mechanical, or an electromagnetic braking force on the brake member.

* * * * *